(No Model.)
D. J. McGREGOR.
SNOW PLOW AND RUTTER.
No. 572,212. Patented Dec. 1, 1896.
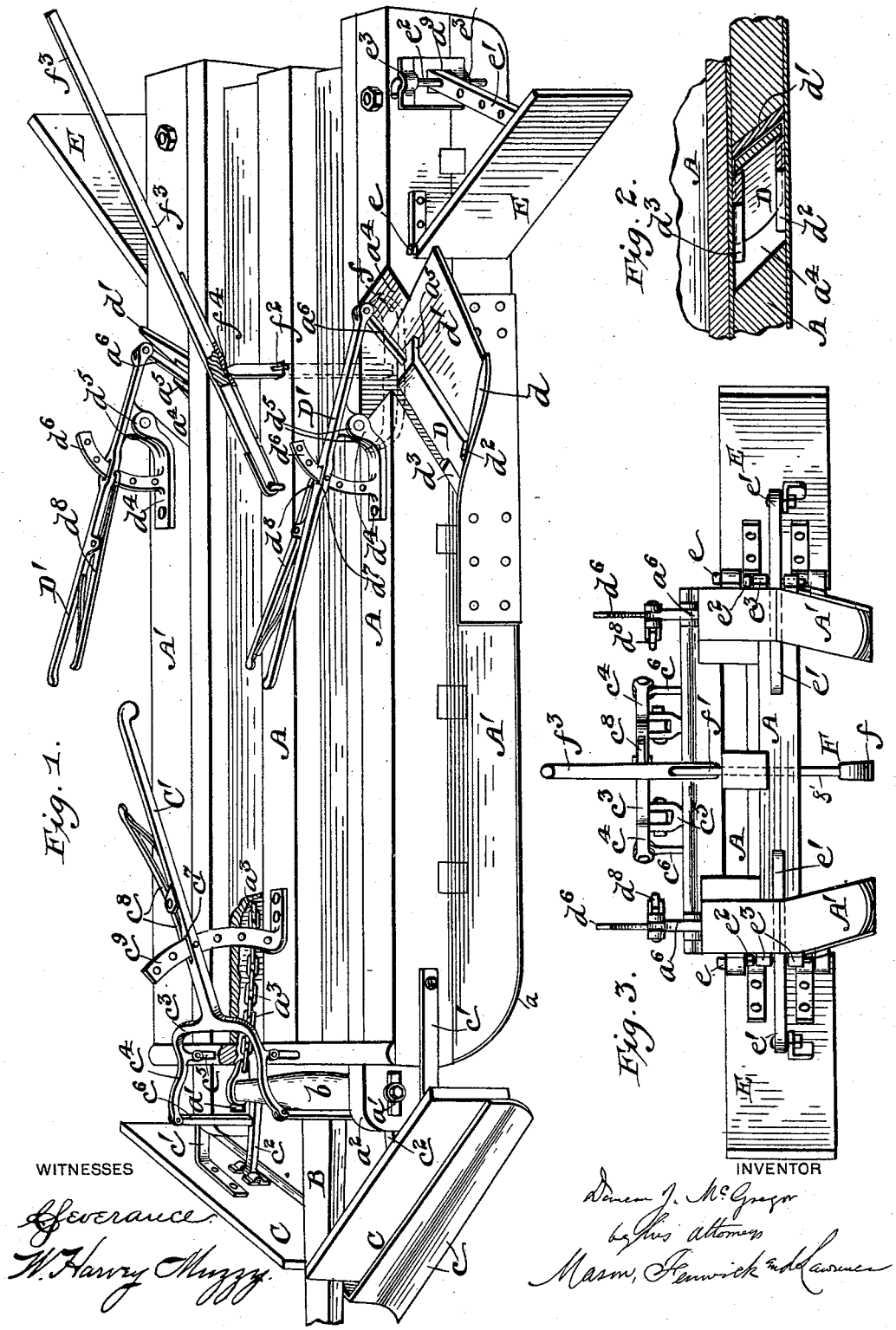
WITNESSES
INVENTOR

UNITED STATES PATENT OFFICE.

DUNCAN JOHN McGREGOR, OF DULUTH, MINNESOTA.

SNOW-PLOW AND RUTTER.

SPECIFICATION forming part of Letters Patent No. 572,212, dated December 1, 1896.

Application filed March 24, 1896. Serial No. 584,675. (No model.)

*To all whom it may concern:*

Be it known that I, DUNCAN JOHN MC-GREGOR, a citizen of the United States, residing at Duluth, in the county of St. Louis and State of Minnesota, have invented certain new and useful Improvements in Snow-Plows and Rutters; and I do hereby declare the following to be a full, clear, and exact description of the invention, such as will enable others skilled in the art to which it appertains to make and use the same.

My invention relates to improvements in snow-plows, and has particular relation to such plows as are intended for cutting ruts in lumber-roads.

The invention consists of the combination, with a sled carrying plows, of a vertically-movable rudder mounted on the sled and means for depressing said rudder to elevate the sled, whereby the latter may be more easily turned.

It also consists of the combination, with a sled, of a snow-plow adjustable vertically thereon, vertically-adjustable rutting-knives mounted on said sled, a vertically-movable rudder, and a lever for depressing the same to elevate the sled, whereby said sled may be more easily turned.

It also consists of certain other novel constructions, combinations, and arrangements of parts, all of which will be hereinafter more fully set forth and claimed.

In the accompanying drawings, forming part of this specification, Figure 1 represents a perspective view of a snow-plow embodying my invention. Fig. 2 represents a detail top plan view, partly broken away, of the portion of my sled immediately surrounding one of the rutting-knives; and Fig. 3 represents a rear elevation of my said improved plow.

A in the drawings represents the frame of the sled; A', the runners of the same; B, the tongue; C, the plow; D D, the rutting-knives; E E, adjustable scraping-wings, and F the rudder.

The frame A is of any desired form and construction and has its runners A' applied on each side of the same so as to incline downward and inwardly toward each other. These runners are suitably shod with iron or steel strips $a$, whereby they are protected from wear. The tongue B, to which the draft-animals are attached, is secured to the frame by a cross-piece $b$, which has its ends loosely mounted in slots $a'$, formed in forward projections $a^2$ of the frame. The ends of the cross-piece $b$ are limited in their movements in the slots $a'$ by chains $a^3 a^3$, that connect its respective ends to the frame. The plow C is preferably of the V-shaped form and is provided with steel edges $c$. Said plow is supported in front of the sled by pivoted levers $c'$ and $c^2$. The levers $c'$ are rigidly attached to the plow, but the levers $c^2$ are pivotally attached to both the sled and the plow. The plow is raised or lowered to the desired degree by a lever C', having a yoke end $c^3$, the arms $c^4$ of which are pivotally mounted on supports $c^5$ of the frame A. The outer ends of the arms $c^4$ are connected to the levers $c^2$ by pivoted links $c^6$. The lever C' is provided with an aperture $c^7$ and a spring-pressed catch $c^8$, whose end projects into said aperture.

A perforated segmental bar $c^9$ is rigidly mounted upon frame A and is adapted to project through the aperture $c^7$ in lever C' and have its perforations engaged by the pivoted catch, whereby the lever may be adjusted to the desired height to raise and lower the plow at will.

The runners A' A' are each provided with inclined guideways $a^4$, in which the rutting-knives D D are mounted. Each guideway is covered on the outside by a wing-plate $d$, and upon one of its inclined sides with a winged guide-plate $d'$, upon which the rutting-knife is adapted to slide. The knife is held down firmly upon this plate $d'$ by lugs or guides $d^2 d^3$, applied, respectively, on the plate $d$ and the inner wall of the guideway $a^4$. The knives are preferably flat, with rounded lower cutting edge and inwardly-turned upper ends $a^5$. Operating-rods $a^6$ are attached to these ends $a^5$ and extend upward out of the tops of the guideways $a^4$ and are each pivoted to an operating-lever D'. Castings $d^4$ are mounted on the frame in proximity to the guideways $a^4$ and are each provided with two upwardly-extending lugs $d^5 d^5$ and an apertured segmental plate $d^6$.

The levers D' are pivoted between the respective lugs $d^5 d^5$ and are each provided with an aperture $d^7$, adapted to work over its respective plate $d^6$. Spring-pressed catches $d^8$ are mounted one on each lever, and their ends are adapted to engage the perforations in the plates $d^6$, so that the levers D' may be secured in the desired adjusted position to project the rutting-knives the desired distance below the runners.

The adjustable scraping-wings E E are hinged to the outer sides of the runners, just to the rear of the guideways, by pins $e$ and are adapted to be adjusted in and out by pivoted apertured bars $e'$, with which they are provided. These bars pass through guiding-apertures $a^9$ in the runners and are secured in the desired adjusted positions by pins $e^2$, that pass through lugs $e^3$, mounted on the runners, and also through the apertures in said bars.

When the snow, ice, and cuttings are thrown up through the guideway $a^4$ by the rutting-knives, they drop outside the runners and are pushed from off the road-bed by the wings E E. The wings also catch and throw to one side all loose snow and ice not caught by the plow C.

The rudder F comprises a runner $f$ and a squared shank $f'$, the latter mounted in a squared aperture in the frame A and capable of vertical movement. The rudder is normally held up out of engagement with the snow and ice by a lateral pin $f^2$, that projects through an aperture in the shank $f'$ and rests upon the top of the sled-frame. When it is desired to turn the sled to one side or the other, the pin $f^2$ is removed, permitting the rudder to descend. The rudder is forced down, so as to lift the rear of the sled, by a lever $f^3$, pivoted to the frame at one end and provided upon its under side with an aperture $f^4$, adapted to fit over the upper end of the shank $f'$. By pressing down upon the rear free end of the lever $f^3$ the rear of the sled is lifted sufficiently out of the snow to permit the sled to be readily turned to either one side or the other.

It will be observed from the above that the amount of snow scraped off by the main plow and the depth of cut of the rutting-knives are always fully under the control of the operator.

My plow is particularly useful in such lumber-roads as are built up, watered, and frozen and then rutted or grooved to form guides for the runners of the lumber-sleds.

Having now described my invention, what I claim as new, and desire to secure by Letters Patent, is—

1. In a snow-plow, the combination with a sled, carrying plows, a vertically-movable rudder mounted on the sled and means for holding said rudder normally up out of contact with the snow, and a lever for depressing said rudder to elevate the sled, whereby the latter may be more easily turned, substantially as described.

2. In a snow-plow, the combination with a sled, of a vertically-adjustable plow mounted in front of the same, and adapted to discharge outside of the runners, rutting-knives mounted in guides upon opposite sides of the sled, wings for throwing the cuttings from said knives outside of the runners adjustable wings for catching said cuttings and throwing them off the road, a vertically-movable rudder mounted on the sled and means for depressing the same at will, substantially as described.

3. In a snow-plow, the combination with a sled carrying plows, of adjustable rutting-knives mounted on said sled, a vertically-movable rudder mounted on the sled, means for holding the rudder normally up, and a lever for depressing the rudder at will, substantially as described.

In testimony whereof I hereunto affix my signature in presence of two witnesses.

DUNCAN JOHN McGREGOR.

Witnesses:
JOHN H. BRIGHAM,
JAMES T. WATSON.